(12) United States Patent
Cheng et al.

(10) Patent No.: US 11,281,261 B2
(45) Date of Patent: Mar. 22, 2022

(54) HINGE MODULE AND ELECTRONIC DEVICE USING THE SAME

(71) Applicants: Acer Incorporated, New Taipei (TW); Sinher Technology Inc., New Taipei (TW)

(72) Inventors: Yan-Fong Cheng, New Taipei (TW); Cheng-Nan Ling, New Taipei (TW); Yi-Ta Huang, New Taipei (TW); Pao-Min Huang, New Taipei (TW); Ting-Hung Su, New Taipei (TW); Yung-Chang Chiang, New Taipei (TW); Shin-Pin Yang, New Taipei (TW); Wu-Chen Lee, New Taipei (TW)

(73) Assignees: Acer Incorporated, New Taipei (TW); Sinher Technology Inc., New Taipei (TW)

( * ) Notice: Subject to any disclaimer, the term of this patent is extended or adjusted under 35 U.S.C. 154(b) by 37 days.

(21) Appl. No.: 16/847,691

(22) Filed: Apr. 14, 2020

(65) Prior Publication Data
US 2020/0241605 A1 Jul. 30, 2020

Related U.S. Application Data

(63) Continuation of application No. 16/122,891, filed on Sep. 6, 2018, now Pat. No. 10,656,685.

(30) Foreign Application Priority Data

Dec. 1, 2017 (TW) .................................. 106142048
Apr. 27, 2018 (TW) .................................. 107114448

(51) Int. Cl.
*E05D 11/00* (2006.01)
*G06F 1/16* (2006.01)
*E05D 7/00* (2006.01)

(52) U.S. Cl.
CPC ............. *G06F 1/1681* (2013.01); *E05D 7/00* (2013.01); *E05D 11/0054* (2013.01); *E05Y 2900/606* (2013.01)

(58) Field of Classification Search
CPC ........ G06F 1/16; G06F 1/1616; G06F 1/1681; G06F 1/166; G06F 1/1679; H04M 1/022;
(Continued)

(56) References Cited

U.S. PATENT DOCUMENTS 3,979,573 A * 9/1976 Burns ....................... F24C 7/02
219/739
4,146,320 A * 3/1979 Schrader ................ G03B 17/04
396/145
(Continued)

FOREIGN PATENT DOCUMENTS

JP 2017161066 A * 9/2017 ........... G06F 1/1613
TW M530009 U * 10/2016

*Primary Examiner* — Chuck Y Mah
(74) *Attorney, Agent, or Firm* — JCIPRNET

(57) ABSTRACT

A hinge module and an electronic device are provided. The electronic device includes a first body and a second body that the hinge module is connected therebetween, and the first and the second bodies are rotated to be folded or unfolded through the hinge module. The hinge module includes a guiding member, a first rail, a rotating shaft, and a linking member. The rotating shaft disposed at the first body in a rotatable and penetrating manner. The linking member is linked between the rotating shaft and the guiding member. The first and the second bodies are rotated relatively to each other via the guiding member and the first rail, and the guiding member drives the linking member to rotate the rotating shaft.

16 Claims, 11 Drawing Sheets

(58) Field of Classification Search
CPC ............ H04M 1/0214; H04M 1/0216; H04M 1/0222; H05K 5/0226; F16M 11/10; E05D 15/28; E05D 15/30; E05D 15/32; E05D 15/40; E05D 1/04; E05D 2001/045; E05D 7/00; E05D 7/0072; E05D 11/0054; E05Y 2900/606; Y10T 16/542; Y10T 16/543; Y10T 16/544; Y10T 16/5443; Y10T 16/5445; Y10T 16/5448; Y10T 16/545; Y10T 16/54038
See application file for complete search history.

(56) References Cited

U.S. PATENT DOCUMENTS

| | | | | |
|---|---|---|---|---|
| 4,960,256 A * | 10/1990 | Chihara | ................ | G06F 1/1616 16/361 |
| 7,375,283 B2 * | 5/2008 | Meeks | ..................... | H01R 4/20 174/84 R |
| 7,669,288 B2 * | 3/2010 | Zeilbeck | ................... | B60R 7/06 16/354 |
| 8,272,104 B2 * | 9/2012 | Chen | ..................... | G06F 1/1616 16/327 |
| 8,434,197 B2 * | 5/2013 | Oshima | .................. | E05D 3/186 16/241 |
| 8,549,708 B1 * | 10/2013 | Kim | .................... | H04M 1/0208 16/239 |
| 8,713,757 B2 * | 5/2014 | Chen | ..................... | G06F 1/1616 16/327 |
| 9,366,064 B1 * | 6/2016 | Chen | ........................ | E05D 3/12 |
| 9,404,298 B1 * | 8/2016 | Chen | ..................... | G06F 1/1681 |
| 9,518,414 B1 * | 12/2016 | Chen | ..................... | H05K 5/0226 |
| 9,822,567 B1 * | 11/2017 | Lin | ....................... | E05D 11/082 |
| 9,834,965 B1 * | 12/2017 | Yao | ......................... | G06F 1/166 |
| 10,066,429 B2 * | 9/2018 | Park | ......................... | E05D 1/04 |
| 10,296,056 B2 * | 5/2019 | Senatori | ................ | G06F 1/1607 |
| 2011/0304983 A1 * | 12/2011 | Senatori | ................ | G06F 1/1616 361/679.55 |
| 2012/0227217 A1 * | 9/2012 | Chen | ..................... | G06F 1/1681 16/366 |
| 2013/0185898 A1 * | 7/2013 | Su | ......................... | G06F 1/1681 16/250 |
| 2014/0168878 A1 * | 6/2014 | Jheng | .................... | G06F 1/1681 361/679.27 |
| 2014/0317882 A1 * | 10/2014 | Chen | ..................... | G06F 1/1681 16/225 |
| 2016/0083989 A1 * | 3/2016 | Kuo | ......................... | E05D 1/04 16/355 |
| 2016/0319581 A1 * | 11/2016 | Lin | ....................... | G06F 1/1681 |
| 2016/0320811 A1 * | 11/2016 | Lin | ....................... | G06F 1/1681 |
| 2017/0139446 A1 * | 5/2017 | Lan | ....................... | G06F 1/1681 |
| 2017/0208703 A1 * | 7/2017 | Lin | ....................... | E05F 1/1016 |
| 2017/0257961 A1 * | 9/2017 | Chen | ........................ | E05D 3/02 |
| 2017/0269637 A1 * | 9/2017 | Lin | ....................... | G06F 1/1615 |
| 2019/0021179 A1 * | 1/2019 | Cheng | ................. | H05K 5/0226 |
| 2019/0064866 A1 * | 2/2019 | Hsu | ........................... | G05F 3/02 |

\* cited by examiner

HINGE MODULE AND ELECTRONIC DEVICE USING THE SAME

CROSS-REFERENCE TO RELATED APPLICATION

This application is a continuation application of and claims the priority benefit of a prior application Ser. No. 16/122,891, filed on Sep. 6, 2018, now allowed. The prior application claims the priority benefit of Taiwan application serial no. 106142048, filed on Dec. 1, 2017, and Taiwan application serial no. 107114448, filed on Apr. 27, 2018. The entirety of each of the above-mentioned patent applications is hereby incorporated by reference herein and made a part of this specification.

BACKGROUND

1. Technical Field

The disclosure relates to a hinge module and an electronic device using the same.

2. Description of Related Art

Portable computing devices, such as pocket personal computers, handheld computers, notebook computers, personal tablet computers, and personal digital assistants become more and more common. Generally, a base unit and a display assembly configured for the display of the base unit are adopted by a portable computing device for allowing operation and viewing for a user. As touch display technologies advance, touch screens have become essential for portable computers.

Taking a notebook computer for example, a rotating shaft module is disposed between two bodies to act as a mechanism enabling movements between the two bodies. Nevertheless, in the notebook computer, the rotating shaft module is exposed outside the bodies (the host and the screen) of the notebook computer, the rotating shaft module may seem redundant visually, and the appearance of the notebook computer is thus less favorable.

SUMMARY

The disclosure provides a hinge module and an electronic device in which the hinge module is accommodated inside one of the bodies of the electronic device through simple components so as to deliver favorable appearance and provide a torsion force capable of supporting the bodies to rotate.

In an embodiment of the disclosure, a hinge module is suited for connecting a first body and a second body of an electronic device as such the first body and the second body may be rotated and folded/unfolded with respect to each other through the hinge module. The hinge module includes a guiding member, a first rail, a rotating shaft, and a linking member. The guiding member and the first rail are disposed at the first body respectively. The guiding member is movably coupled to the first rail. The rotating shaft is disposed at the first body in a rotatable and penetrating manner. The linking member is linked between the rotating shaft and the guiding member. The first and the second bodies are rotated to be folded or unfolded via the guiding member and the first rail, and the guiding member drives the linking member to rotate the rotating shaft.

The disclosure further provides an electronic device including a first body, a second body, and a hinge module. The hinge module includes a guiding member, a first rail, a rotating shaft, and a linking member. The guiding member and the first rail are disposed at the first body respectively. The guiding member is movably coupled to the first rail. The rotating shaft is disposed at the first body in a rotatable and penetrating manner. The linking member is linked between the rotating shaft and the guiding member. The first and the second bodies are rotated to be folded or unfolded via the guiding member and the first rail, and the guiding member drives the linking member to rotate the rotating shaft.

To sum up, the electronic device reduces the space inside the second body by arranging the linking member with a simple design and thereby it is achieved that a thin design of the electronic device. Simultaneously, the torsion force generated by the rotating shaft located inside the second body is further transferred to the first body through the linking member. In this way, the hinge module and the electronic device using the same may provide the torsion force required to support the first body to rotate, and favorable appearance of the electronic device may be obtained at the same time.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
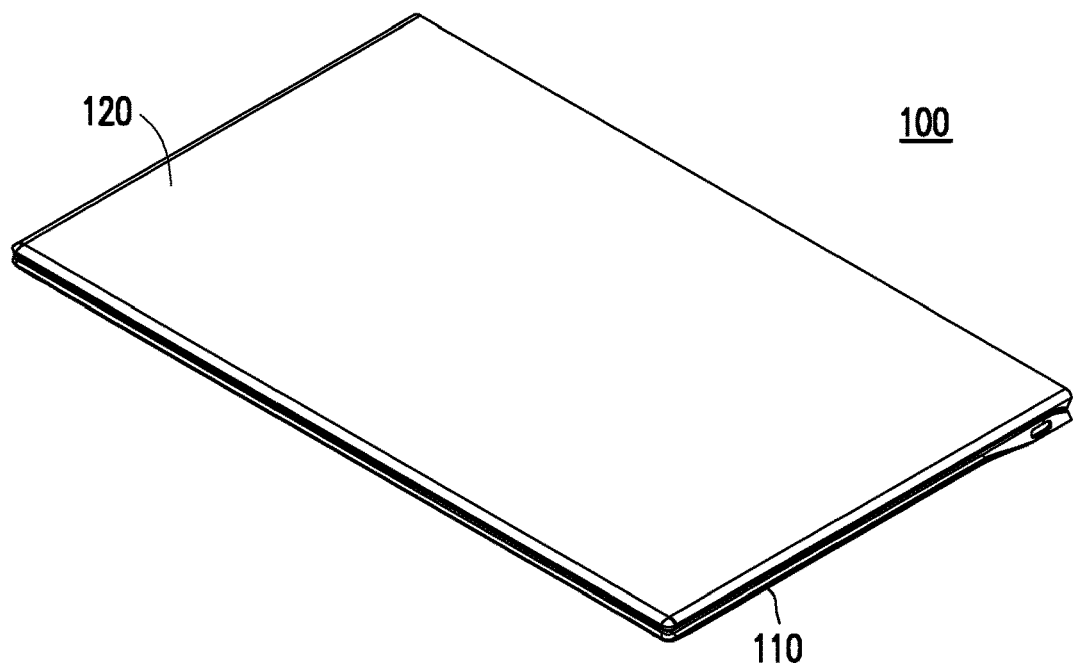
FIG. 1 is a schematic view of an electronic device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
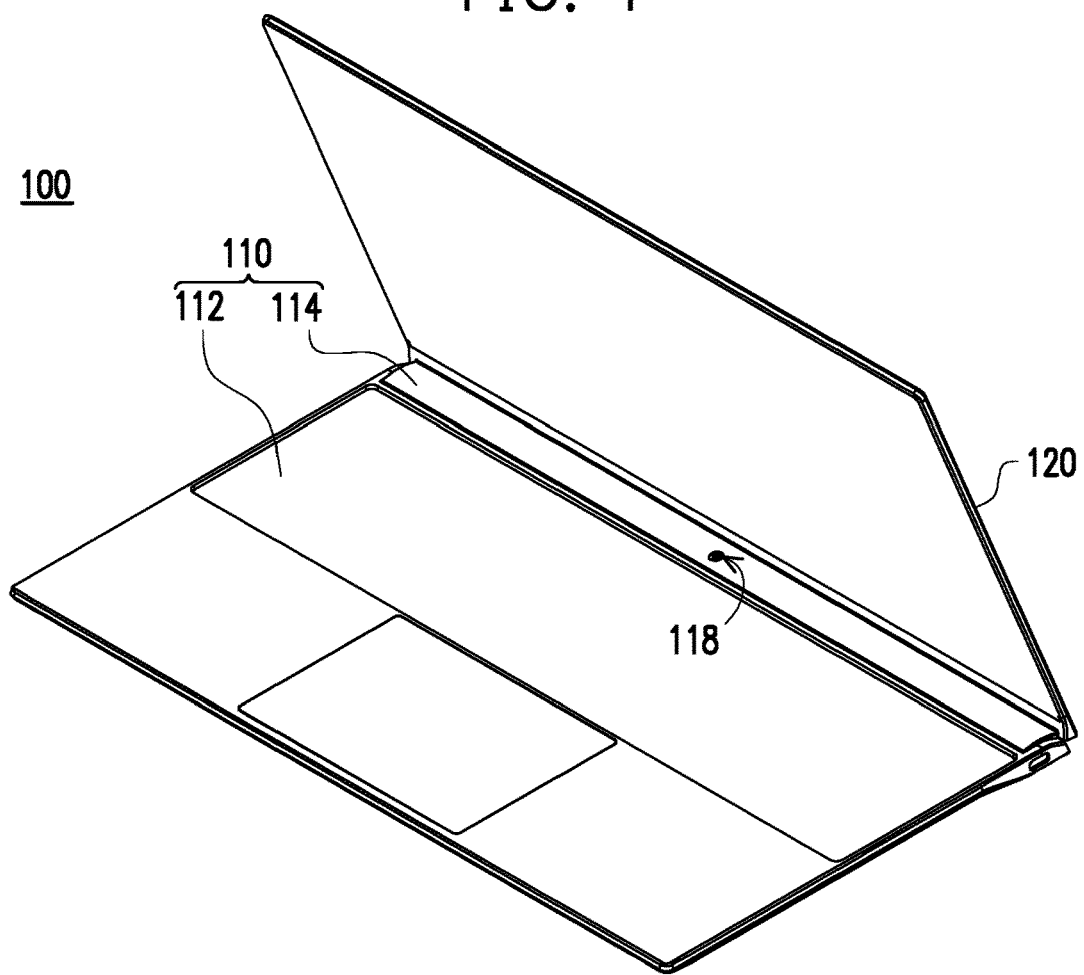
FIG. 2 is a schematic view of the electronic device of FIG. 1 in another state.
Figure 3:
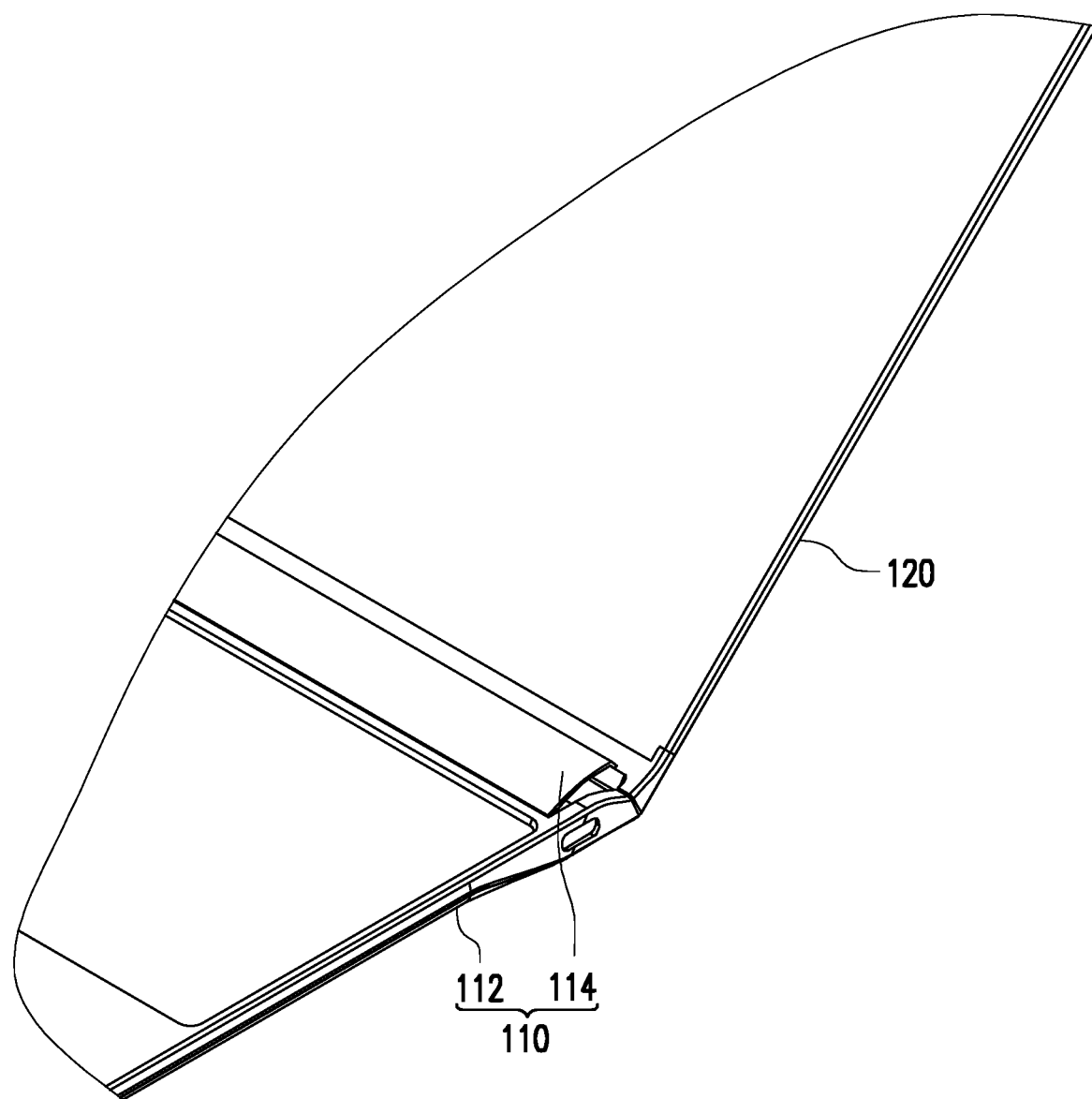
FIG. 3 is a partial enlarged view of the electronic device of FIG. 2.
Figure 4:
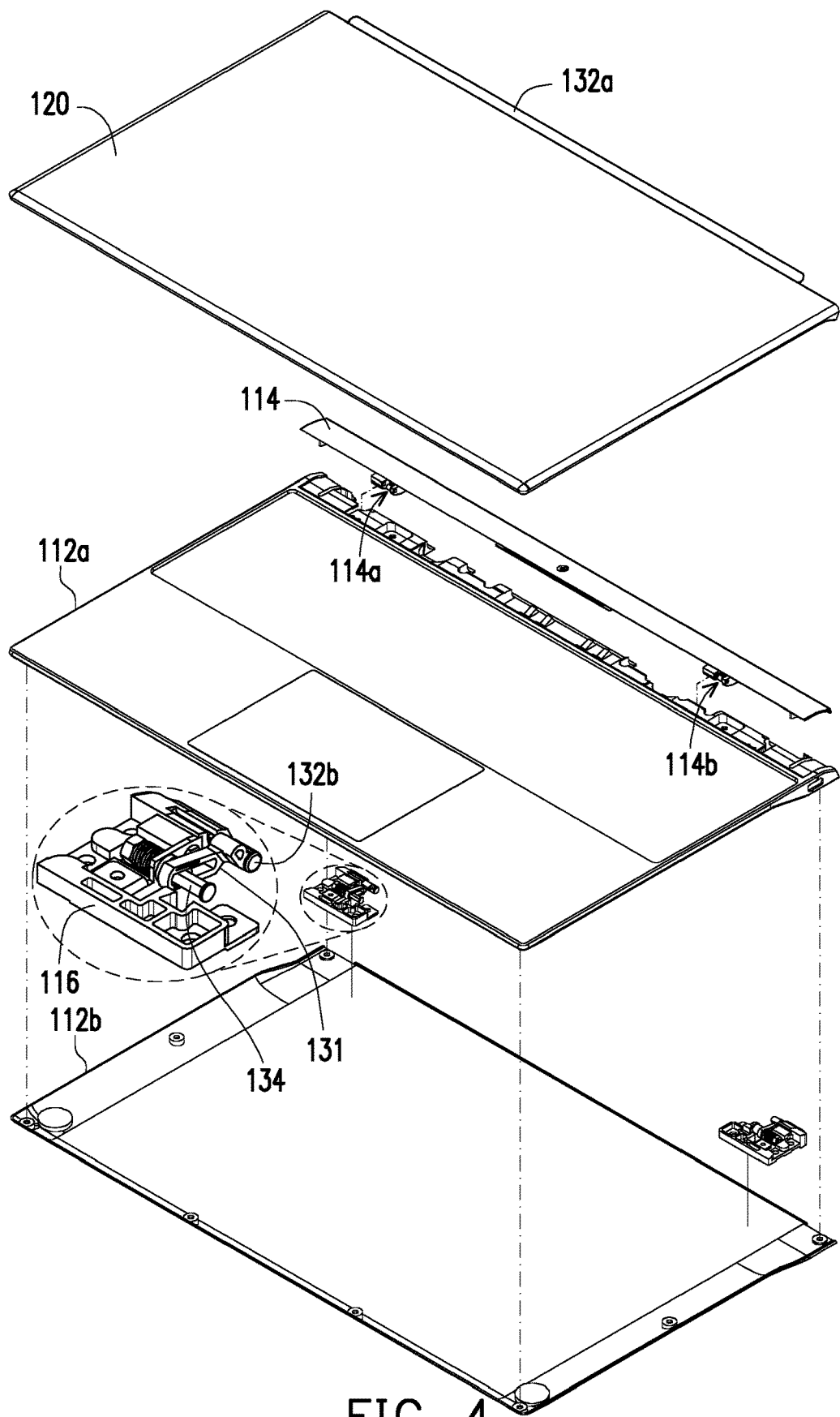
FIG. 4 and FIG. 5 are respectively exploded views of portions of the electronic device.
Figure 5:
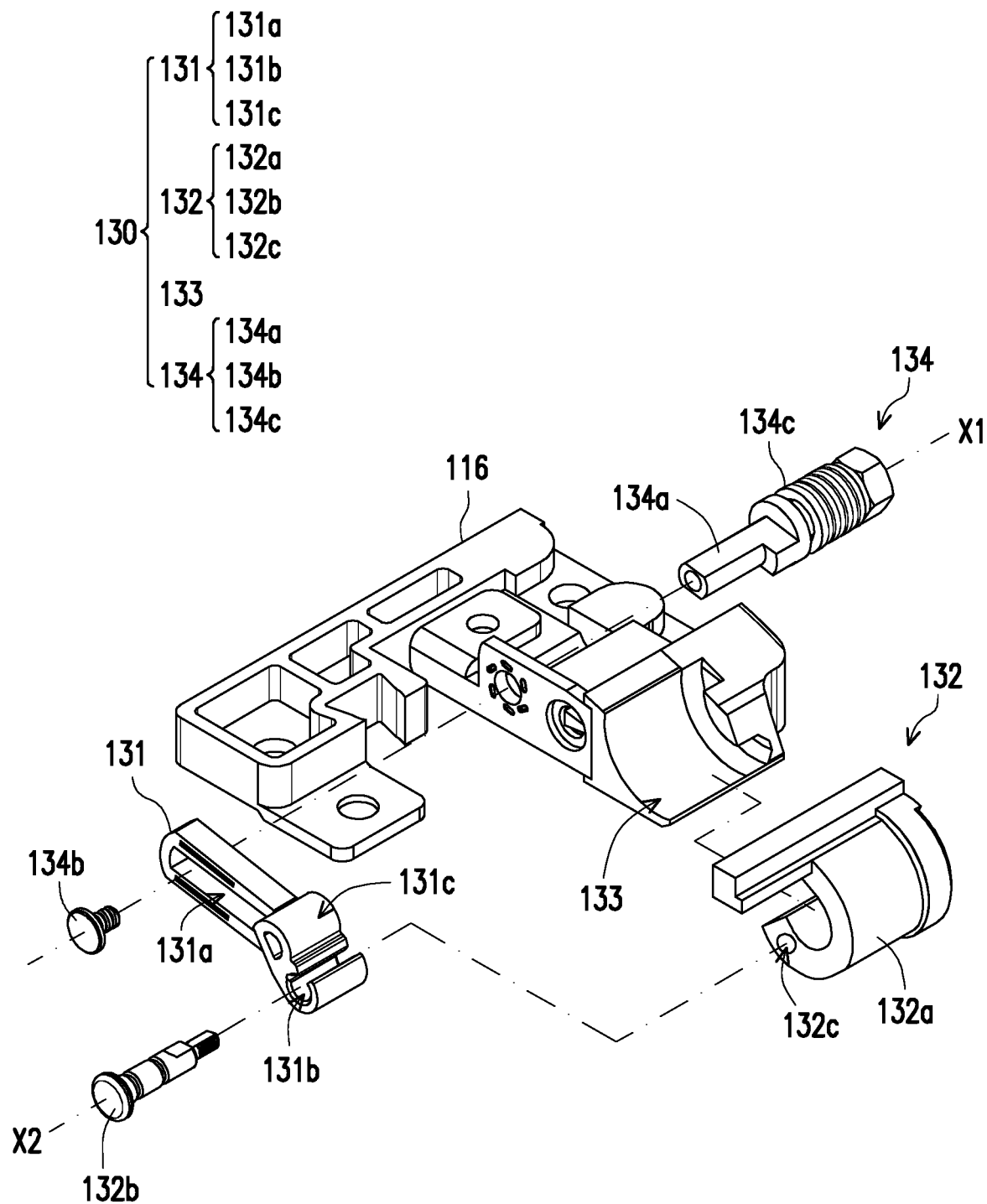

FIG. 1 is a schematic view of an electronic device according to an embodiment of the disclosure. FIG. 2 is a schematic view of the electronic device of FIG. 1 in another state. FIG. 3 is a partial enlarged view of the electronic device of FIG. 2. FIG. 4 and FIG. 5 are respectively exploded views of portions of the electronic device. With reference to FIGS. 1-5, in this embodiment, an electronic device 100 is, for example, a notebook computer and includes a first body 110 (e.g., a screen), a second body 120 (e.g., a host), and a hinge module 130. The hinge module 130 is connected between the first body 110 and the second body 120 and accordingly acts as a medium structure for rotating and folding/unfolding the first body 110 with respect to the second body 120. As shown in FIG. 2 and FIG. 3, a main torque component of the hinge module 130 of this embodiment is not substantially exposed outside the first body 110 or the second body 120, such that favorable appearance of the device can be ensured and a torsion force required by the device is maintained at the same time.

With reference to FIG. 4 and FIG. 5 together, to be specifically, the hinge module 130 includes a linking member 131, a guiding member 132, a first rail 133, and a rotating shaft 134, wherein the guiding member 132 is disposed at the second body 120, the first rail 133 is disposed at the first body 110, and the guiding member 132 is movably coupled to the first rail 133. The rotating shaft 134 is disposed at the first body 110 in a rotatable and penetrating manner, and the linking member 131 is linked between the rotating shaft 134 and the guiding member 132. The first body 110 and the second body 120 are rotated to be folded or unfolded relatively to each other via the guiding member 132 and the first rail 133, and the guiding member 132 drives the linking member 131 to rotate the rotating shaft 134.

The first body 110 includes a main body 112 and a cover body 114, and the main body 112 is further divided into an upper case 112a and a lower case 112b. A structure body 116 is disposed at the lower case 112b of the first body 110, the first rail 133 is disposed at the structure body 116, and the rotating shaft 134 is disposed at the structure body 116 in a rotatable and penetrating manner, wherein the rotating shaft 134 rotates about a first axis X1. As shown in FIG. 5, the rotating shaft 134 includes a shaft body 134a, a screwing member 134b, and a torsion assembly 134c, wherein the torsion assembly 134c is disposed at the shaft body 134a, and the screwing member 134b is screwed to the shaft body 134a after the shaft body 134a penetrating the structure body 116 and a second rail 131a of the linking member 131 so as to latch the shaft body 134a to the linking member 131, and an end of the shaft body 134a is movably coupled and pivoted to the linking member 131.

Figure 6:
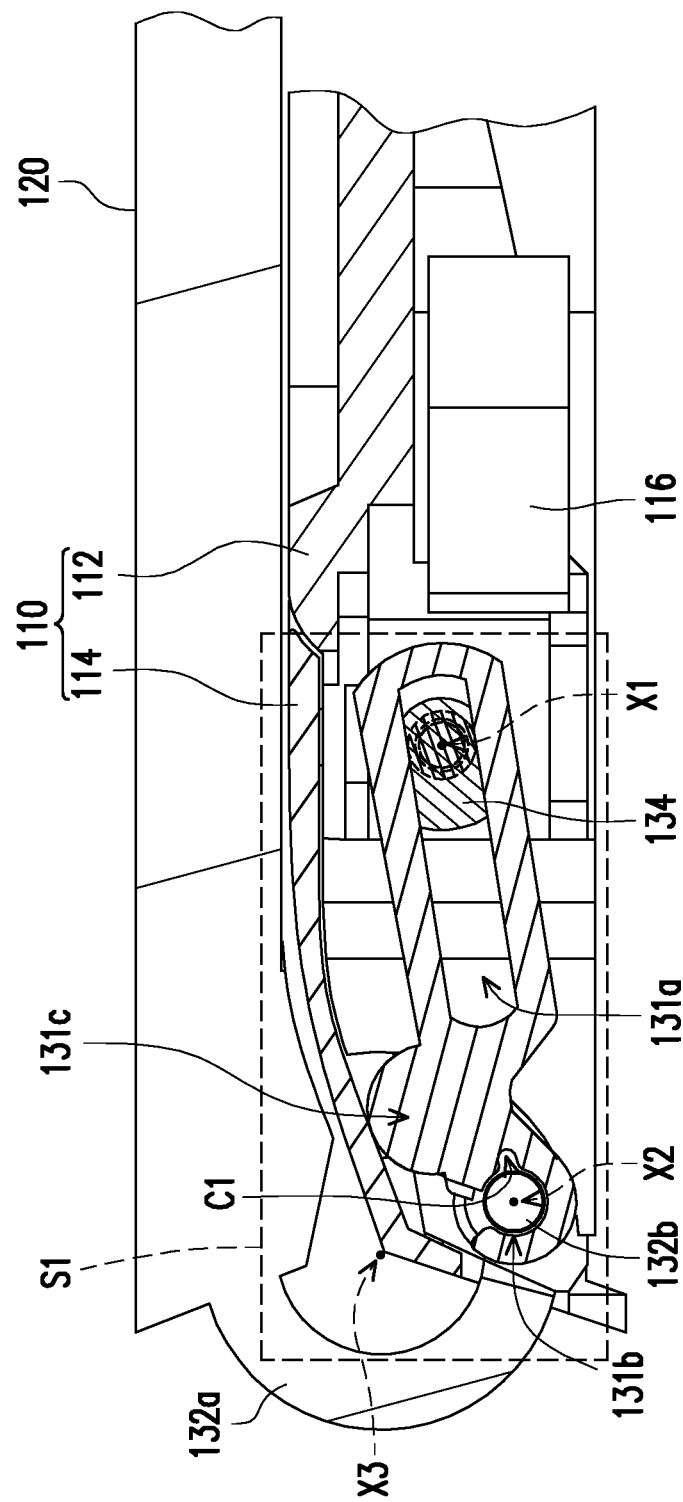
FIG. 6 to FIG. 8 are respectively partial cross-sectional views of the electronic device.
Figure 7:
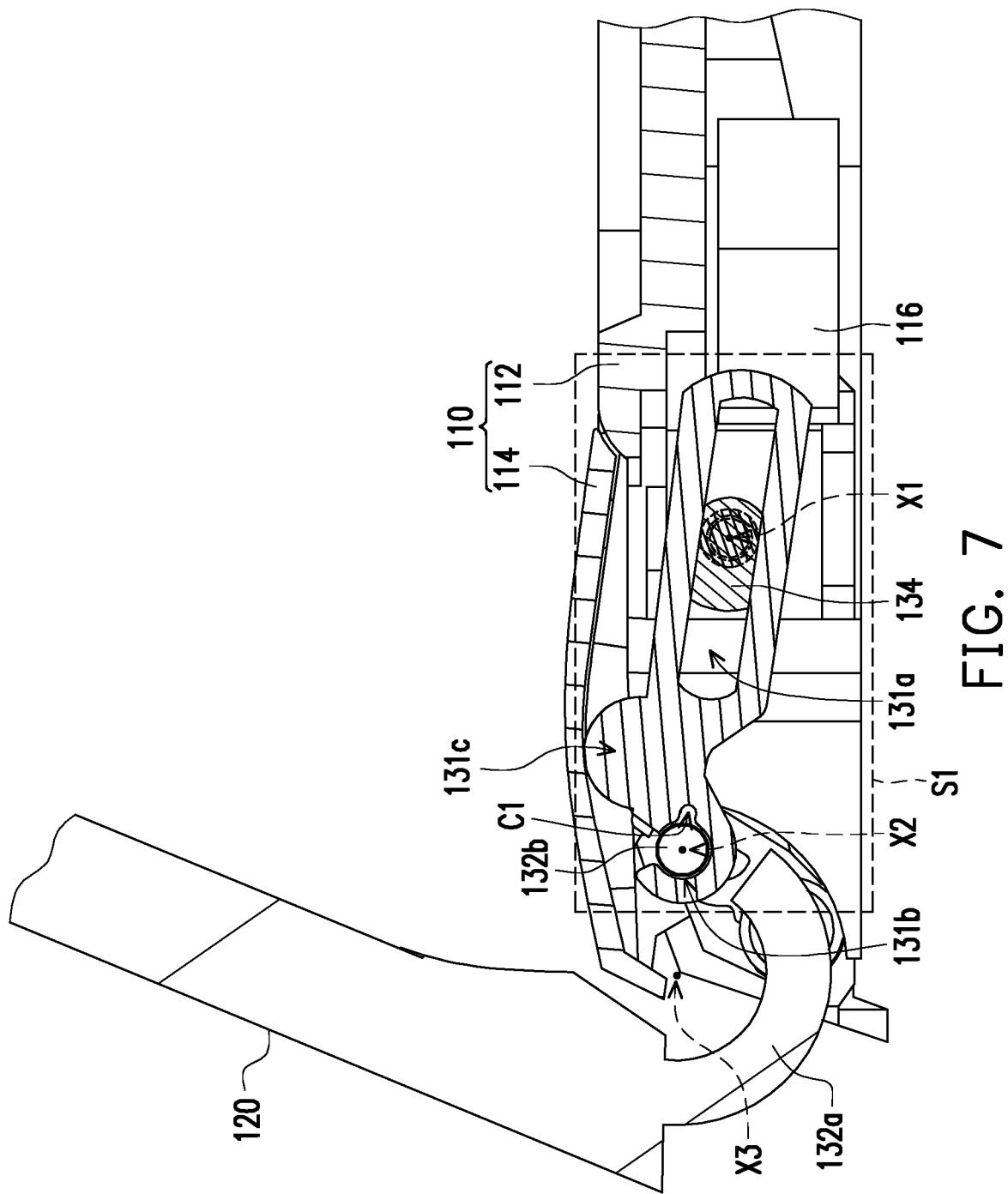
Figure 8:
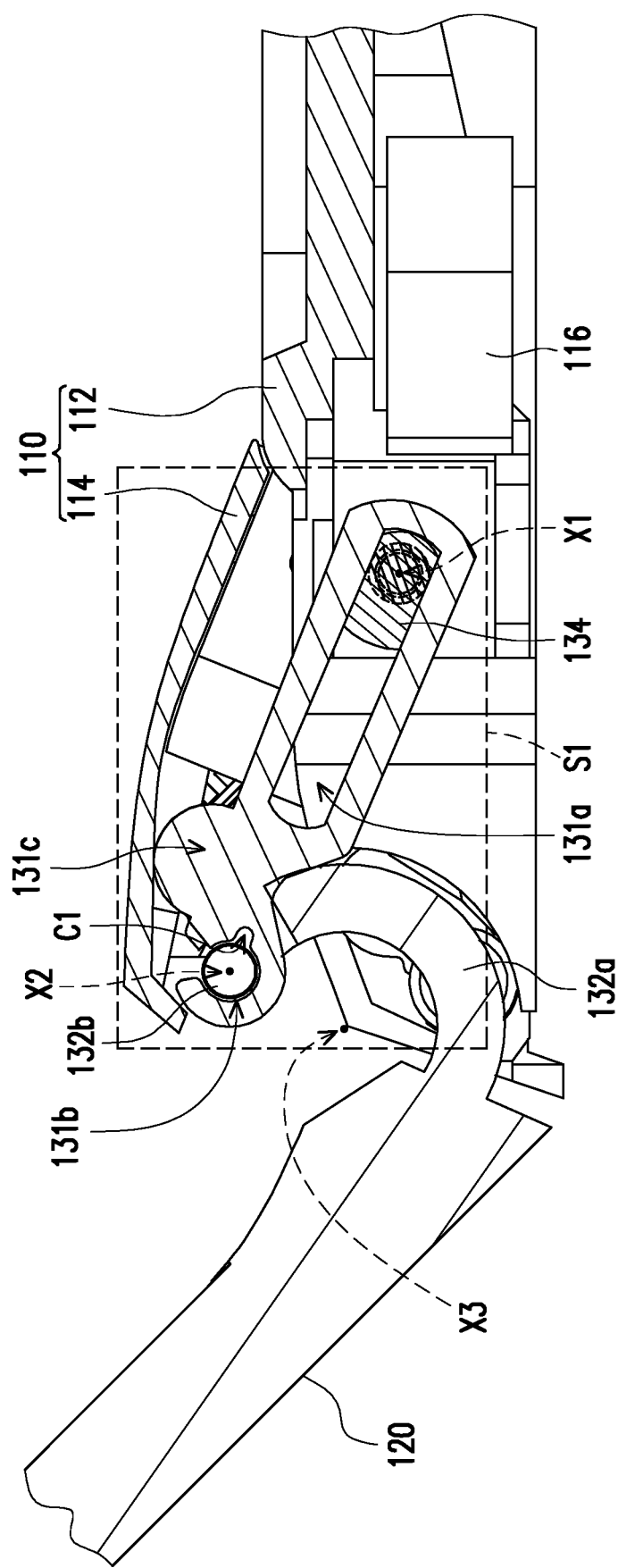

FIG. 6 to FIG. 8 are respectively partial cross-sectional views of the electronic device. Please referring FIG. 4 to FIG. 6, in the embodiment, the first rail 133 is an arc rail, and the guiding member 132 is arc-shaped to match the arc rail, such that the first body 110 and the second body 120 are rotated about a third axis X3. In other words, the first body 110 and the second body 120 generate a rotation about the third axis X3 via an adaptation design of the guiding member 132 and the first rail 133. In the embodiment, the guiding member 132 includes parts 132a and 132b, wherein the part 132a has a pivoting hole 132c. Correspondingly, the linking member 131 further includes an opening slot 131b distant from the second rail 131a and a protruding portion 131c located between the second rail 131a and the opening slot 131b. The part 132b penetrates the opening slot 131b and is pivoted to the pivoting hole 132, such that an end of the linking member 131 distant from the second rail 131a and the guiding member 132 develop a pivoting relation about a second axis X2.

Based on disposition described above, when the second body 120 is forced by a user to rotate relative to the first body 110, the guiding member 132 moves along the first rail 133 to generate a rotation of the bodies and to drive the linking member 131 to rotate the rotating shaft 134, wherein the first axis X1, the second axis X2, and the third axis X3 are parallel to each other. As shown in FIG. 6 to FIG. 8, the linking member 131 rotates and moves on a plane S1, and the first axis X1, the second axis X2, and the third axis X3 are orthogonal to the plane S1 respectively. Therefore, a torsion force generated by the torsion assembly 134c of the rotating shaft 134 could be smoothly transferred to the second body 120.

In the embodiment, the guiding member 132 and the second body 120 are integral structure, the first rail 133 and the first body 110 are integral structure, and the guiding member 132 moves along the first rail 133 to be exposed out of the first body 110 or hidden in the first body 110 in the appearance of the electronic device 100.

In addition, the configuration of the opening slot 131b of the linking member 131 is arranged in accordance with the movement of the linking member 131 inside the first body 110, such that an opening of the opening slot 131b constantly faces a top side of the first body 110 (the opening actually faces upwardly in FIG. 6 to FIG. 8). That is, in the rotation of the first body 110 and the second body 120 relatively to be unfolded (from FIG. 6 to FIG. 8), the guiding member 132 moves the linking member 131 via the part 132b. At this time, an orientation of the opening (of the opening slot 131b) could be regarded as being identical to a moving direction of the part 132b, such that an interfering force of the linking member 131 is reduced while the part 132b moving upwardly, and the first body 110 and the second body 120 are unfolded with less force applied by the user. In another rotation of the first body 110 and the second body to be folded as shown from FIG. 8 to FIG. 6, the part 132b is interfered with the bottom of the opening slot 131b which also means that there is no opening under the part 132b. Therefore, much force is required to fold the first body 110 and the second body 120 smoothly. According to above processes, the bodies of the electronic device 100 may be opened lightly and closed forcibly (to enhance the sensation of the user while folding the bodies) could be achieved according to the orientation the opening of the opening slot 131b with respect to the linking member 131 and the part 132b.

In addition, the first linking member 131 of this embodiment further includes a recess C1 located at the opening slot 131b. Contours of the second rotating shaft 132b and the opening slot 131b are shaped in a manner which may lead to rotational interference; in other words, structural interference is generated when the two are rotated with respect to each other in one specific angular range and is not generated when the two are rotated with respect to each other in the other specific angular range. It thus can be seen that the recess C1 may enable the opening slot 131b to be deformed easily. In other words, the opening groove 131b may be deformed when interfering with the second rotating shaft 132b from a microscopic perspective through the opening contour thereof. Such deformation is further enhanced through the recess C1, meaning that a fulcrum may be formed at the recess C1 in a physical structure of the opening slot 131b, and rotational deformation of a local portion of the physical structure of the opening groove 131b located at a left side of the recess C1 may be generated more easily around the fulcrum.

With reference to FIG. 6 to FIG. 8, it also can be seen that when the first body 110 and the second body 120 are switched from a folded state (as shown in FIG. 6) to an unfolded state (as shown in FIG. 8), the guiding member 132 moves along the first rail 133 and gradually submerges under the first body 110. On the contrary, when the first body 110 and the second body 120 are switched from the unfolded state to the folded state, the guiding member 132 moves along the first rail 133 and gradually moves out of the first body 110. That is, in the appearance of the electronic device 100, one local portion of the guiding member 132 gradually submerges under the first body 110 from one side, and another local portion of the guiding member 132 gradually protrudes out of the first body 110 from another side.

Please referring FIG. 6 to FIG. 8 and taking FIG. 2 to FIG. 4 for reference, a cover body 114 of the first body 110 is pivoted to the upper case 112*a* of the main body 112 through a pivoting portion 114*a* and a pivoting portion 114*b*. Accordingly, the protruding portion 131*c* is located between the second rail 131*a* and a position where the part 132*b* and the linking member 131 are pivoted. Moreover, the cover body 114 is located on a moving path of the protruding portion 131*c*. As such, when the second body 120 is opened with respect to the first body 110, the protruding portion 131*c* of the linking member 131 is driven to protrude out of a top side of the first body 110 and is abutted against and lift the cover body 114, and that the cover body 114 is rotated and flipped. As shown in FIG. 2, a through hole 118 is disposed on the cover body 114 of this embodiment. Therefore, an electronic module (e.g., a speaker module or a camera module, not shown) may be disposed at a bottom of the electronic device 100 through the cover body 114. When the cover body 114 is lifted and flipped, the opening hole 118 may act as a speaker hole or a camera hole, and a type and a number of the opening hole 118 and a position where the opening hole 118 is disposed on the cover body are not limited. By viewing FIG. 6 to FIG. 8 sequentially, a part of the guiding member 132 is pivoted to another part of the linking member 131 to form a pivoting portion, wherein the pivoting portion of the guiding member 132 and the linking member 131 is lifted-up to be over a linking line of the two axes (the first axis X1 and the second axis X2) during the rotation, or the pivoting portion being lowered-down to be under the linking line of the two axes during the rotation. A relative distance of the pivoting portion and the axis is A, a relative distance of the pivoting portion and another axis is B, a relative distance of the two axes is C, A+B≥C, and C is a constant.

Figure 9:
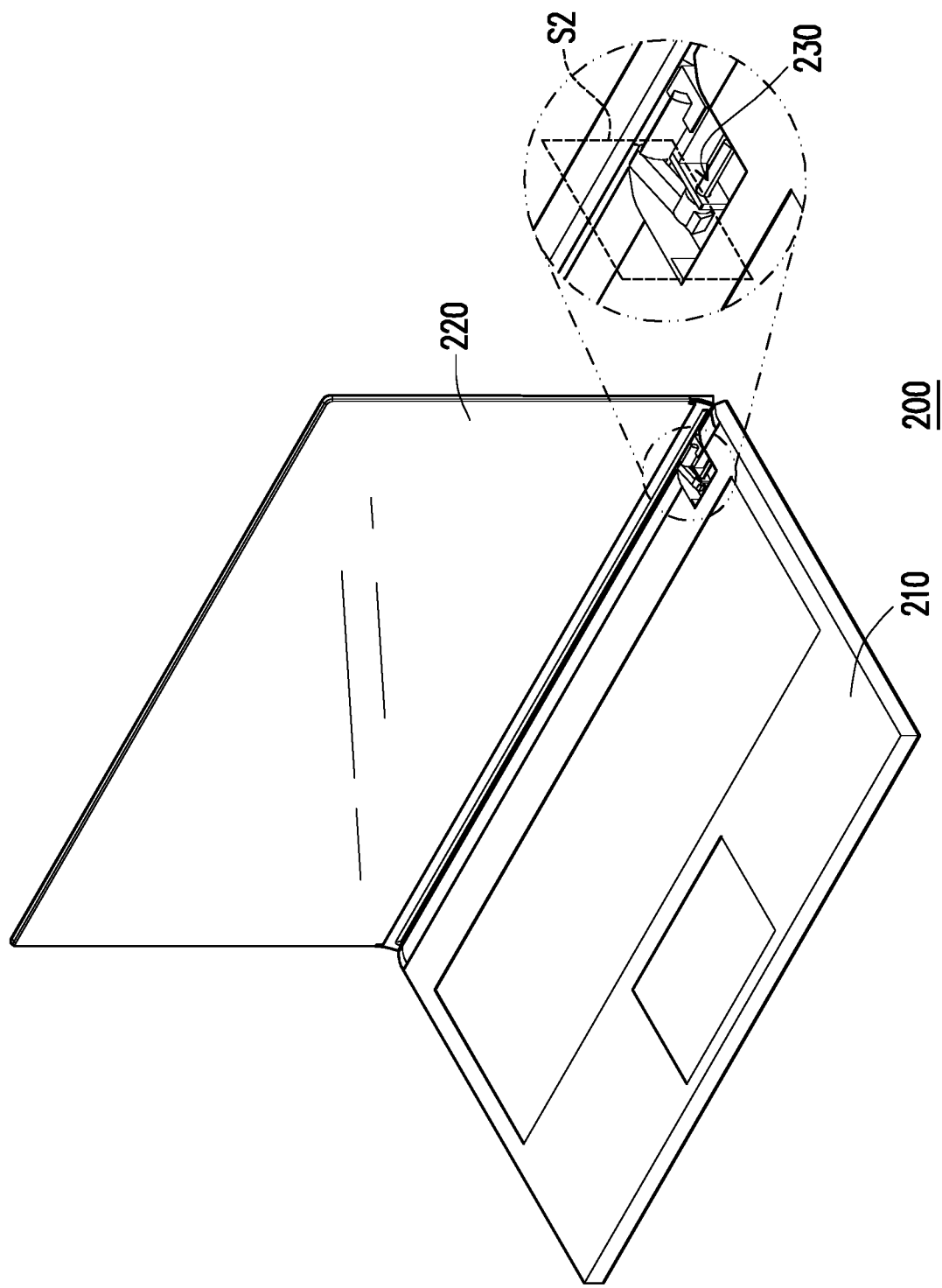
FIG. 9 is a schematic view of an electronic device according to another embodiment of the disclosure.
Figure 10:
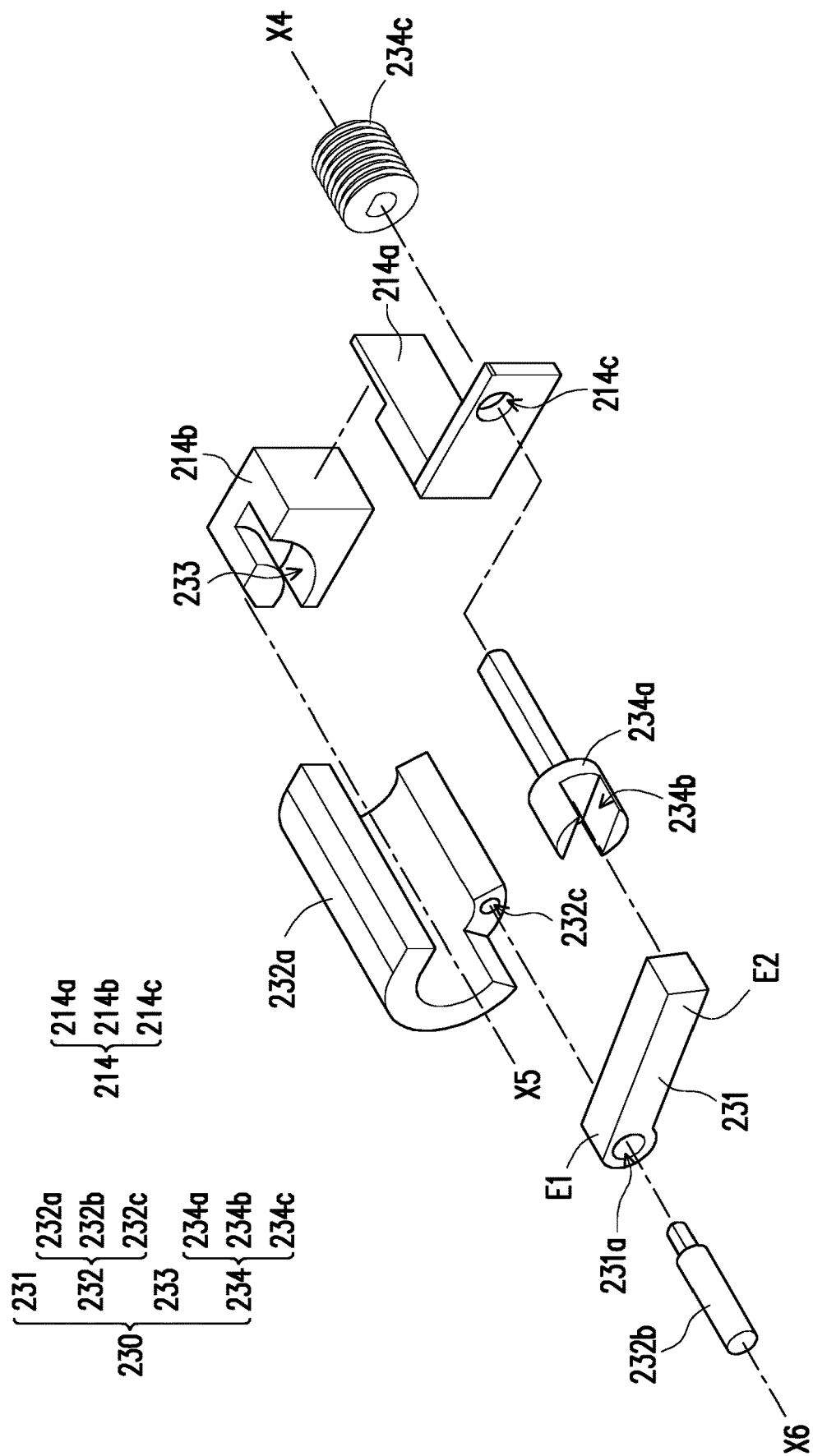
FIG. 10 is an exploded view of portions of the electronic device of FIG. 9.

FIG. 9 is a schematic view of an electronic device according to another embodiment of the disclosure. FIG. 10 is an exploded view of portions of the electronic device of FIG. 9. With reference to FIG. 9 and FIG. 10, in this embodiment, the electronic device 200 is also a notebook computer as the former embodiment but not limited thereto. The electronic device 200 includes a first body 210, a second body 220, and a hinge module 230. Similar to the former embodiment, the hinge module 230 is connected between the first body 210 and the second 220 to be a medium structure for rotating and folding/unfolding the first body 210 with respect to the second body 220.

In the embodiment, the hinge module 230 includes a linking member 231, a guiding member 232, a first rail 233, and a rotating shaft 234, wherein the guiding member 232 is disposed at the second body 220, the first rail 233 is disposed at the first body 210, and the guiding member 232 movably coupled to the first rail 233. The rotating shaft 234 disposed at the first body 210 in a rotatable and penetrating manner. The linking member 231 is linked between the rotating shaft 234 and the guiding member 232. The first body 210 and the second body 220 are rotated to be folded or unfolded relatively to each other via the guiding member 232 and the first rail 233, and the guiding member 232 drives the linking member 231 to rotate the rotating shaft 234.

Specifically, a structure body 214 disposed inside the first body 210 includes a first structure 214*a* and a second structure 214*b* integrated with each other, wherein the first rail 233 disposed at the second structure 214*b* is an arc rail. The rotating shaft 234 includes a shaft body 234*a*, a second rail 234*b*, and a torsion assembly 234*c*, wherein the second rail 234*b* is disposed at an end of the shaft body 234*a*, and another end of the shaft body 234*a* passing a through hole 214*c* of the first structure 214*a* to be connected with the torsion assembly 234*c*. The linking member 231 has a first end E1 and a second end E2 opposite to each other, wherein the second end E2 movably coupled to the second rail 234*b* in a penetrating manner. Furthermore, the guiding member 232 includes a part 232*a*, a pivoting member 232*b*, and a pivoting hole 232*c*, wherein the part 232*a* movably coupled to the first rail 233, the pivoting member 232*b* passing a through hole 231*a* located at the first end E1 of the linking member 231 to pivot to the pivoting hole 232*c*.

Based on the configuration above, in a process that the user force the second body 220 to rotate and unfold relative to the first body 210, the part 232*a* of the guiding member 232 moves along the first rail 233 so as to drive the linking member 231 to rotate the rotating shaft 234. At the same time, a torsion force generated by the torsion assembly 234*c* is transferred to the second body 220 through the linking member 231. In the embodiment, the rotating shaft 234 generates a rotation about a first axis X4, the part 232*a* of the guiding member 232 is arc-shaped to adapt to the first rail 233 (arc rail) to generate a rotation about a second axis X5. Moreover, the linking member 231 and the guiding member 232 generate a rotation about a third axis X6 since a coupling relationship of the linking member 231 and the rotating shaft 234, and it also means that a force transferring is smoothly occurred between the first axis X4 and the second axis X5 because of the motion of the linking member 231. The first axis X4, the second axis X5, and the third axis X6 are parallel to each other in the embodiment.

Figure 11:
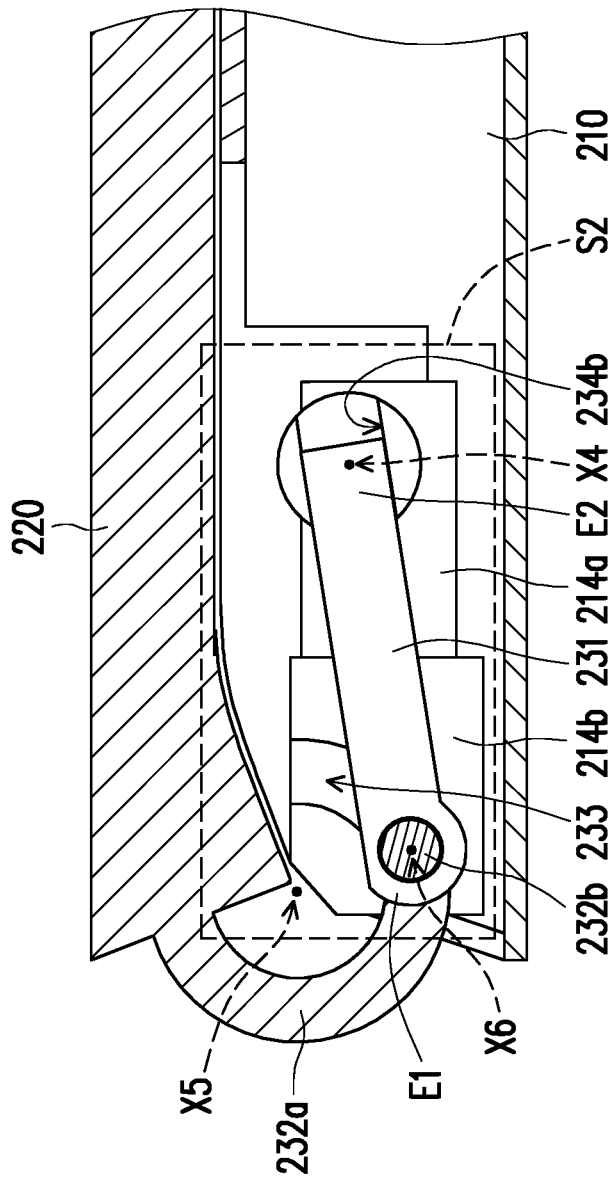
FIG. 11 and FIG. 12 are respectively partial cross-sectional views of the electronic device in different states.
Figure 12:
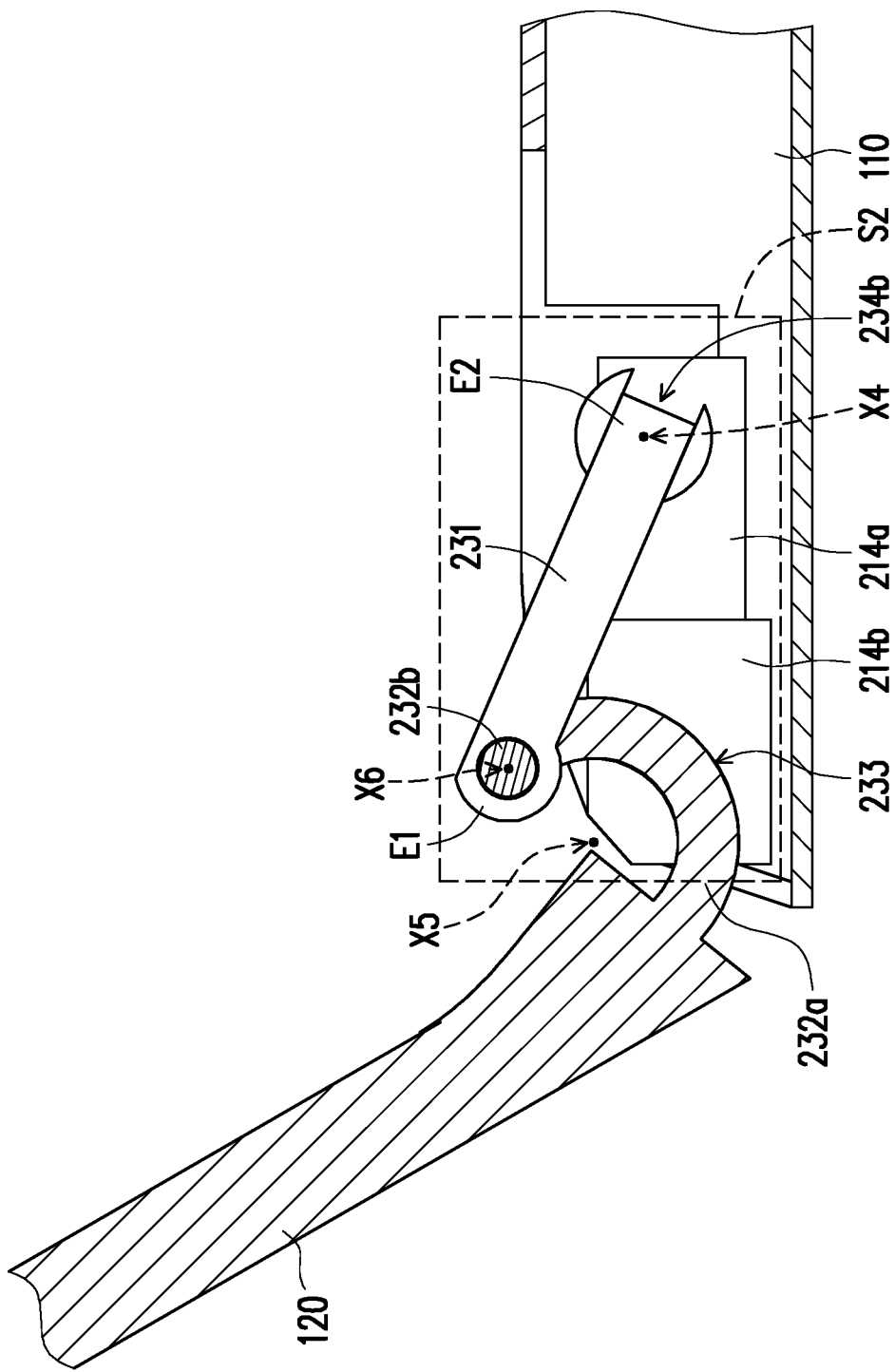

FIG. 11 and FIG. 12 are respectively partial cross-sectional views of the electronic device in different states. With reference to FIG. 10 to FIG. 12, the linking member 231 rotates and moves on a plane S2, and the first axis X4, the second axis X5, and the third axis X6 are orthogonal to the plane S2 respectively.

It is noted that the guiding member 232 and the second body 220 is an integral structure, the first rail 233 and the first body 210 is an integral structure, and the guiding member 232 moves along with the second body 220 to submerge into the first body 210 of exposed out of the first body 210 in the rotation of the first body 210 and the second body 220. Therefore, favorable and identical appearance of the electronic device 200 and convenience of manufacture may be obtained.

With reference to FIG. 11 and FIG. 12, in the embodiment, the guiding member 232 moves along with the second body 223 to rotate about the second axis X5 in counter-clockwise direction during the rotation of the first body 210 and the second body 220 relatively to be switched from the folded state to the unfolded state. The guiding member 232 drives the linking member 231 to rotate in clockwise direction and rotate the rotating shaft about the first axis X4 in clockwise direction. Since the linking member 231 slides and passes through the second rail 234*b* as well, the linking member 231 is pushed by the guiding member 232 to move to the right, and then the linking member 231 is pulled by the guiding member 232 to move to the left. At the same time, a portion of the guiding member 232 moves along the first rail 233 to submerge into the first body 210. On the contrary, the guiding member 232 rotates about the second axis X5 in clockwise direction during the rotation of the first body 210 and the second body 220 to be switched from the unfolded state to the folded state. The guiding member 232 rotates the linking member 231 in counterclockwise direction, and also rotates the rotating shaft 234 about the first axis in counterclockwise direction. The motion of the related members is reversed as described above and omitted hereinafter. By viewing FIG. 11 and FIG. 12, a part of the guiding member 232 is pivoted to another part of the linking member 231 to form a pivoting portion, wherein the pivoting portion of the guiding member 232 and the linking member 231 is lifted-up to be over a linking line of the two axes (the first axis X4 and the second axis X6) during the rotation, or the pivoting portion being lowered-down to be under the linking line of the two axes during the rotation. A relative distance of the pivoting portion and the axis is A, a relative distance of the pivoting portion and another axis is B, a relative distance of the two axes is C, A+B≥C, and C is a constant.

In view of the foregoing, in the electronic device of the disclosure, the hinge module includes the guiding member and the first rail being coupled and fitting to each other so as to generate a rotation thereof, and the guiding member drives the linking member to rotate the rotating shaft smoothly while the first body and the second being forced and rotated relatively to each other to be folded or unfolded. The torsion assembly of the hinge module is disposed in the first body, such that the torsion force generated from the torsion assembly is transferred to the second body through the linking member and the guiding member so as to provide the torsion force required to support the second body to be in an unfolded state with fixed angle.

Moreover, the rotating shaft and the linking member are disposed in the first body, and the guiding member being hidden in or exposed out of the first body along with the second body, such that a favorable appearance of the electronic device may be obtained at the same time. Specifically, according to the collocation of the second rail on the rotating shaft and the linking member, or the collocation of the second rail on the linking member and the rotating shaft, the linking mechanism of the hinge module could be simplified to reduce the space occupied by the hinge module inside the first body. The manufacturing process could be simplified and the cost of the electronic device could be reduced on the premise that the bodies of the electronic device are folded or unfolded normally, and the electronic device has light and thin in the appearance of the bodies.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A hinge module, suited for connecting a first body and a second body of an electronic device, the first body and the second body being rotated and folded/unfolded with respect to each other through the hinge module, the hinge module comprising:
a rotating shaft, disposed at the first body via penetrating along an axis and rotating about the axis;
a linking member, linked to the rotating shaft;
a guiding member, disposed at the second body and rotating about another axis; and
a first rail, disposed at the first body, the guiding member being movably coupled to the first rail, the first body and the second body being rotated via the guiding member and the first rail,
wherein one of the rotating shaft and the linking member has a second rail, and the other one is movably coupled to the second rail,
the first body and the second body being folded or unfolded during a rotation of the hinge module, and the guiding member driving the linking member to rotate the rotating shaft,
a part of the guiding member is pivoted to another part of the linking member to form a pivoting portion, the pivoting portion being lifted-up to be over a linking line of the two axes during the rotation, or the pivoting portion being lowered-down to be under the linking line of the two axes during the rotation.

2. The hinge module as claimed in claim 1, wherein the two axes are parallel to each other, and the pivoting portion is located between the two axes during the rotation.

3. The hinge module as claimed in claim 1, wherein an end portion of the rotating shaft has the second rail, an end of the linking member is movably disposed at the second rail, and another end of the linking member is pivoted to the guiding member.

4. The hinge module as claimed in claim 1, wherein the linking member has the second rail, an end portion of the rotating shaft is movably disposed at the second rail, and an end of the linking member distant from the second rail is pivoted to the guiding member.

5. The hinge module as claimed in claim 1, wherein the first rail is an arc rail, and the guiding member is arc-shaped to match the arc rail.

6. The hinge module as claimed in claim 1, wherein the first body comprises a main part and a cover pivoted to the main part, the cover is located on a moving path of the linking member, and the first rail, the rotating shaft and the linking member are disposed in the main part,
wherein the linking member pushes the cover upwardly while the pivoting portion being over the linking line of the two axes, and the cover is rotated and lifted to be opened relative to the main part by the linking member,
wherein the cover is rotated and lowered down to be closed relative to the main part by the linking member while the pivoting portion being under the linking line of the two axes.

7. The hinge module as claimed in claim 1, wherein a relative distance of the pivoting portion and the axis is A, a relative distance of the pivoting portion and another axis is B, a relative distance of the two axes is C, A+B≥C, and C is a constant.

8. The hinge module as claimed in claim 1, wherein the axis that the rotating shaft rotated about is fixed in the first body.

9. An electronic device, comprising:
a first body;
a second body;
a hinge module, comprising:
a rotating shaft, disposed at the first body via penetrating along an axis and rotating about the axis;
a linking member, linked to the rotating shaft;
a guiding member, disposed at the second body and rotating about another axis; and
a first rail, disposed at the first body, the guiding member being movably coupled to the first rail, the first body and the second body being rotated via the guiding member and the first rail, wherein one of the rotating shaft and the linking member has a second rail, and the other one is movably coupled to the second rail, the first body and the second body being folded or unfolded during a rotation of the hinge module, and the guiding member driving the linking member to rotate the rotating shaft, a part of the guiding member is pivoted to another part of the linking member to form a pivoting portion, the pivoting portion being lifted-up to be over a linking line of the two axes during the rotation, or the pivoting portion being lowered-down to be under the linking line of the two axes during the rotation.

10. The electronic device as claimed in claim 9, wherein the two axes are parallel to each other, and the pivoting portion is located between the two axes during the rotation.

11. The electronic device as claimed in claim 9, wherein an end portion of the rotating shaft has the second rail, an end of the linking member is movably disposed at the second rail, and another end of the linking member is pivoted to the guiding member.

12. The electronic device as claimed in claim 9, wherein the linking member has the second rail, an end portion of the rotating shaft is movably disposed at the second rail, and an end of the linking member distant from the second rail is pivoted to the guiding member.

13. The electronic device as claimed in claim 9, wherein the first rail is an arc rail, and the guiding member is arc-shaped to match the arc rail.

14. The electronic device as claimed in claim 9, wherein the first body comprises a main part and a cover pivoted to the main part, the cover is located on a moving path of the linking member, and the first rail, the rotating shaft and the linking member are disposed in the main part, wherein the linking member pushes the cover upwardly while the pivoting portion being over the linking line of the two axes, and the cover is rotated and lifted to be opened relative to the main part by the linking member, wherein the cover is rotated and lowered down to be closed relative to the main part by the linking member while the pivoting portion being under the linking line of the two axes.

15. The electronic device as claimed in claim 9, wherein a relative distance of the pivoting portion and the axis is A, a relative distance of the pivoting portion and another axis is B, a relative distance of the two axes is C, $A+B \geq C$, and C is a constant.

16. The electronic device as claimed in claim 9, wherein the axis that the rotating shaft rotated about is fixed in the first body.

* * * * *